US011277347B2

(12) United States Patent
Gervais

(10) Patent No.: US 11,277,347 B2
(45) Date of Patent: *Mar. 15, 2022

(54) INFERENCE SERVER AND ENVIRONMENT CONTROL DEVICE FOR INFERRING AN OPTIMAL WIRELESS DATA TRANSFER RATE

(71) Applicant: Distech Controls Inc., Brossard (CA)

(72) Inventor: Francois Gervais, Lachine (CA)

(73) Assignee: DISTECH CONTROLS INC., Brossard (CA)

( * ) Notice: Subject to any disclaimer, the term of this patent is extended or adjusted under 35 U.S.C. 154(b) by 8 days.

This patent is subject to a terminal disclaimer.

(21) Appl. No.: 16/803,172

(22) Filed: Feb. 27, 2020

(65) Prior Publication Data

US 2020/0195566 A1 Jun. 18, 2020

Related U.S. Application Data

(63) Continuation of application No. 15/815,074, filed on Nov. 16, 2017, now Pat. No. 10,616,121.

(51) Int. Cl.
*H04L 12/825* (2013.01)
*H04L 29/08* (2006.01)
(Continued)

(52) U.S. Cl.
CPC .............. *H04L 47/25* (2013.01); *G05B 17/02* (2013.01); *G06N 3/00* (2013.01); *H04L 47/14* (2013.01);
(Continued)

(58) Field of Classification Search
CPC ..... H04L 67/12; H04L 67/025; H04L 67/125; H04L 12/801; H04L 12/825;
(Continued)

(56) References Cited

U.S. PATENT DOCUMENTS 4,999,833 A * 3/1991 Lee .................. G06N 5/022
370/312
7,450,523 B1 11/2008 Robertson et al.
(Continued)

OTHER PUBLICATIONS

Garcia-Hernandez et al., "Wireless Sensor Networks and Applications: a Survey," IJCSNS International Journal of Computer Science and Network Security, vol. 7 No. 3, Mar. 2007, pp. 264-273.
(Continued)

*Primary Examiner* — James N Fiorillo
(74) *Attorney, Agent, or Firm* — RatnerPrestia

(57) ABSTRACT

Inference server and computing device for inferring an optimal wireless data transfer rate. The computing device determines parameters of a data transfer through a wireless communication interface of the computing device, and transmits the parameters of the data transfer to the inference server. The inference server receives the parameters of the data transfer, executes a neural network inference engine using a predictive model (generated by a neural network training engine) for inferring an optimal data transfer rate based on the parameters of the data transfer, and transmits the optimal data transfer rate to the computing device. The computing device receives the optimal data transfer rate, and configures its wireless communication interface to operate at the optimal data transfer rate. For example, the computing device consists of an environment control device (e.g. an environment controller, a sensor, a controlled appliance, and a relay).

22 Claims, 14 Drawing Sheets

(51) Int. Cl.
*H04L 12/801* (2013.01)
*G05B 17/02* (2006.01)
*H04W 28/10* (2009.01)
*G06N 3/00* (2006.01)
*H04L 47/25* (2022.01)
*H04L 67/025* (2022.01)
*H04W 28/02* (2009.01)
*H04L 67/12* (2022.01)

(52) U.S. Cl.
CPC ............ *H04L 67/025* (2013.01); *H04L 67/12* (2013.01); *H04W 28/10* (2013.01)

(58) Field of Classification Search
CPC ..... H04L 12/2803; H04L 47/14; H04L 47/25; H04L 29/08; H04L 41/0246; H04L 43/00; G06N 3/00; G06N 3/08; G06N 3/084; H04W 28/10; H04W 4/02; G05B 17/02; G05B 19/4185; A63F 13/30
USPC ........................................................ 709/233
See application file for complete search history.

(56) References Cited

U.S. PATENT DOCUMENTS

| | | | | |
|---|---|---|---|---|
| 10,187,313 | B2* | 1/2019 | Natarajan | H04M 1/72409 |
| 2002/0047775 | A1* | 4/2002 | del Castillo | H04L 12/2803 340/3.54 |
| 2002/0186660 | A1 | 12/2002 | Bahadiroglu | |
| 2003/0012222 | A1* | 1/2003 | Rinchiuso | H04L 1/1809 370/468 |
| 2007/0043478 | A1* | 2/2007 | Ehlers | F24F 11/30 700/276 |
| 2009/0043407 | A1* | 2/2009 | Mathiesen | G05B 19/4185 700/48 |
| 2010/0226349 | A1* | 9/2010 | Matsuo | H04L 1/188 370/338 |
| 2012/0092991 | A1* | 4/2012 | Jeong | H04W 28/0236 370/235 |
| 2013/0117685 | A1* | 5/2013 | Jang | H04N 21/41407 715/744 |
| 2013/0201316 | A1* | 8/2013 | Binder | H04L 67/12 348/77 |
| 2014/0050087 | A1* | 2/2014 | Pasotti | H04L 47/34 370/230 |
| 2014/0337473 | A1* | 11/2014 | Frusina | H04N 21/23406 709/217 |
| 2015/0019024 | A1* | 1/2015 | Sabripour | G06N 3/063 700/276 |
| 2015/0063374 | A1* | 3/2015 | Venkatachalam Jayaraman | H03M 7/30 370/476 |
| 2015/0146549 | A1* | 5/2015 | Noriega | H04W 24/02 370/252 |
| 2015/0227841 | A1* | 8/2015 | Laing | E21B 49/003 706/19 |
| 2016/0105308 | A1* | 4/2016 | Dutt | H04L 41/083 709/221 |
| 2016/0234342 | A1* | 8/2016 | Oonk | H04L 67/12 |
| 2017/0034316 | A1* | 2/2017 | Pei | H04W 48/18 |
| 2017/0111253 | A1* | 4/2017 | Girish | H04W 4/02 |
| 2017/0172415 | A1* | 6/2017 | Wik | H04L 67/04 |
| 2017/0180440 | A1* | 6/2017 | Schulz | H04L 65/60 |
| 2017/0229009 | A1* | 8/2017 | Foster | H04W 4/023 |
| 2017/0264657 | A1 | 9/2017 | Lee et al. | |
| 2017/0286860 | A1* | 10/2017 | Chen | G06N 3/08 |
| 2017/0318602 | A1* | 11/2017 | Wang | H04N 21/64792 |
| 2018/0077025 | A1* | 3/2018 | Helvey | H04L 67/125 |
| 2018/0121601 | A1 | 5/2018 | Hahm et al. | |
| 2018/0198694 | A1 | 7/2018 | Wells et al. | |
| 2019/0007997 | A1* | 1/2019 | Shiotani | H04B 7/0617 |
| 2019/0044246 | A1* | 2/2019 | Pitsillides | H01Q 3/46 |
| 2019/0065990 | A1 | 2/2019 | Sharma et al. | |
| 2019/0138899 | A1* | 5/2019 | Hoshizuki | G06N 3/08 |
| 2020/0364588 | A1* | 11/2020 | Knox | H04L 67/12 |

OTHER PUBLICATIONS

Entire prosecution history of U.S. Appl. No. 15/815,074, filed Nov. 16, 2017, entitled "Inference Server and Environment Control Device for Inferring an Optimal Wireless Data Transfer Rate."
Final Office Action for U.S. Appl. No. 15/815,162, dated Jan. 24, 2020, 12 pages.
Non Final Office Action for U.S. Appl. No. 15/815,162, dated Feb. 1, 2021, 33 pages.
Non Final Office Action for U.S. Appl. No. 15/815,162, dated Aug. 16, 2019, 18 pages.
Non Final Office Action for U.S. Appl. No. 15/815,162, dated Dec. 14, 2018, 21 pages.
Final Office Action for U.S. Appl. No. 15/815,162, dated May 24, 2021, 22 pages.
Non Final Office Action for U.S. Appl. No. 15/815,162, dated Jan. 24, 2022, 17 pages.

* cited by examiner

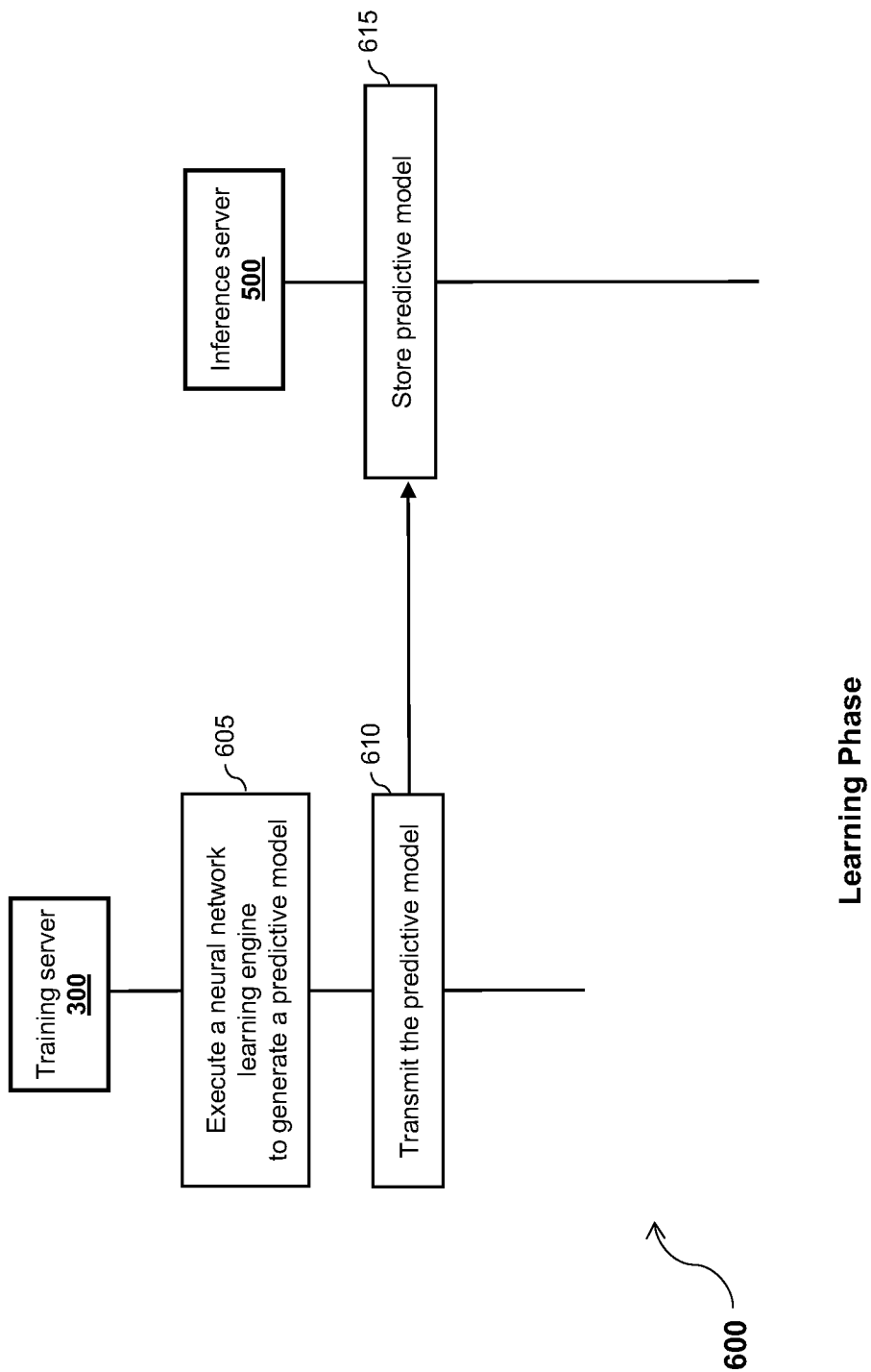

INFERENCE SERVER AND ENVIRONMENT CONTROL DEVICE FOR INFERRING AN OPTIMAL WIRELESS DATA TRANSFER RATE

CROSS-REFERENCE TO RELATED APPLICATIONS

This application is a continuation of U.S. patent application Ser. No. 15/815,074, filed Nov. 16, 2017, now allowed, entitled "INFERENCE SERVER AND ENVIRONMENT CONTROL DEVICE FOR INFERRING AN OPTIMAL WIRELESS DATA TRANSFER RATE," the disclosure of which is entirely incorporated herein by reference.

TECHNICAL FIELD

The present disclosure relates to the field of environment control systems. More specifically, the present disclosure relates to an inference server and an environment control device (ECD) for inferring an optimal wireless data transfer rate.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances.

Communications between an environment controller and the devices under its control (sensors, controlled appliances, etc.) were traditionally based on wires. The wires are deployed in the building where the environment control system is operating, for instance in the walls, ceilings, and floors of multiple rooms in the building. Deploying wires in a building is usually disrupting for the daily operations in the building and costly. Thus, recently deployed environment controllers and devices under their control (sensors, controlled appliances, etc.) are using one or more wireless communication protocol (e.g. Wi-Fi, mesh, etc.) to exchange environmental data.

The environment controller and the devices under its control (sensors, controlled appliances, etc.) are generally referred to as Environment Control Devices (ECDs). An ECD comprises processing capabilities for processing data received via a wireless communication interface and/or generating data transmitted via the wireless communication interface.

The wireless communication interface is generally capable of operating at different data transfer rates. A driver of the wireless communication interface implements a simple algorithm for controlling the data transfer rate, which consists of trying to transfer data at the best possible data transfer rate. If this data transfer rate cannot be sustained, the driver lowers the data transfer rate to a lower value. This process is repeated until the selected data transfer rate can be sustained.

The ECDs may be operating in hostile conditions in terms of wireless data transmission (e.g. in industrial environments), which negatively affects the data transfer rate. Alternatively, the ECDs may be sharing an available wireless spectrum with other devices and competing with these other devices for access to the wireless spectrum, which also negatively affects the data transfer rate. Therefore, the data transfer rate of the ECDs need to be adapted on a regular basis, and the aforementioned process implemented by the driver of the wireless communication interface may be too long and not efficient.

An alternative process may consist in defining a set of rules taking into consideration current conditions for performing a wireless data transfer to select an optimal data transfer rate adapted to the current conditions. However, the parameters affecting the speed of a wireless data transfer are multiple, and are generally inter-related. Thus, the aforementioned set of rules would either by too simple to properly model the conditions for performing a wireless data transfer, or alternatively too complicated to be designed by a human being.

However, current advances in artificial intelligence, and more specifically in neural networks, can be taken advantage of to define a model taking into consideration current conditions for performing a wireless data transfer to select an optimal data transfer rate adapted to the current conditions.

Therefore, there is a need for a new inference server and environment control device (ECD) for inferring an optimal wireless data transfer rate.

SUMMARY

According to a first aspect, the present disclosure relates to a computing device. The computing device comprises a wireless communication interface, and a processing unit. The processing unit determines parameters of a data transfer through the wireless communication interface. The processing unit transmits the parameters of the data transfer through the wireless communication interface to an inference server executing a neural network inference engine. The transmission of the parameters is performed via one of the wireless communication interface or another communication interface of the computing device. The processing unit receives an optimal data transfer rate inferred by the neural network inference engine executed by the inference server. The reception of the optimal data transfer rate is performed via one of the wireless communication interface or the other communication interface of the computing device. The processing unit configures the wireless communication interface to operate at the optimal data transfer rate.

According to a second aspect, the present disclosure relates to a method for inferring an optimal wireless data transfer rate using an inference server. The method comprises determining, by a processing unit of a computing device, parameters of a data transfer through a wireless communication interface of the computing device. The method comprises transmitting, by the processing unit, the parameters of the data transfer through the wireless communication interface to an inference server executing a neural network inference engine. The transmission of the parameters is performed via one of the wireless communication interface or another communication interface of the computing device. The method comprises receiving, by the processing unit, an optimal data transfer rate inferred by the neural network inference engine executed by the inference server. The reception of the optimal data transfer rate is performed via one of the wireless communication interface or the other communication interface of the computing device. The method comprises configuring, by the processing unit, the wireless communication interface to operate at the optimal data transfer rate.

According to a third aspect, the present disclosure relates to an inference server. The inference server comprises a communication interface, memory for storing a predictive model generated by a neural network training engine, and a processing unit. The processing unit receives from a computing device via the communication interface parameters of a data transfer through a wireless communication interface of the computing device. The processing unit executes a neural network inference engine using the predictive model for inferring an optimal data transfer rate based on the parameters of the data transfer through the wireless communication interface of the computing device. The processing unit transmits to the computing device via the communication interface the optimal data transfer rate inferred by the neural network inference engine.

BRIEF DESCRIPTION OF THE DRAWINGS

Embodiments of the disclosure will be described by way of example only with reference to the accompanying drawings, in which:

FIGS. 4A and 4B illustrate a second method implemented by the ECD of FIG. 3 for inferring an optimal wireless data transfer rate using a neural network;

DETAILED DESCRIPTION

Figure 1:
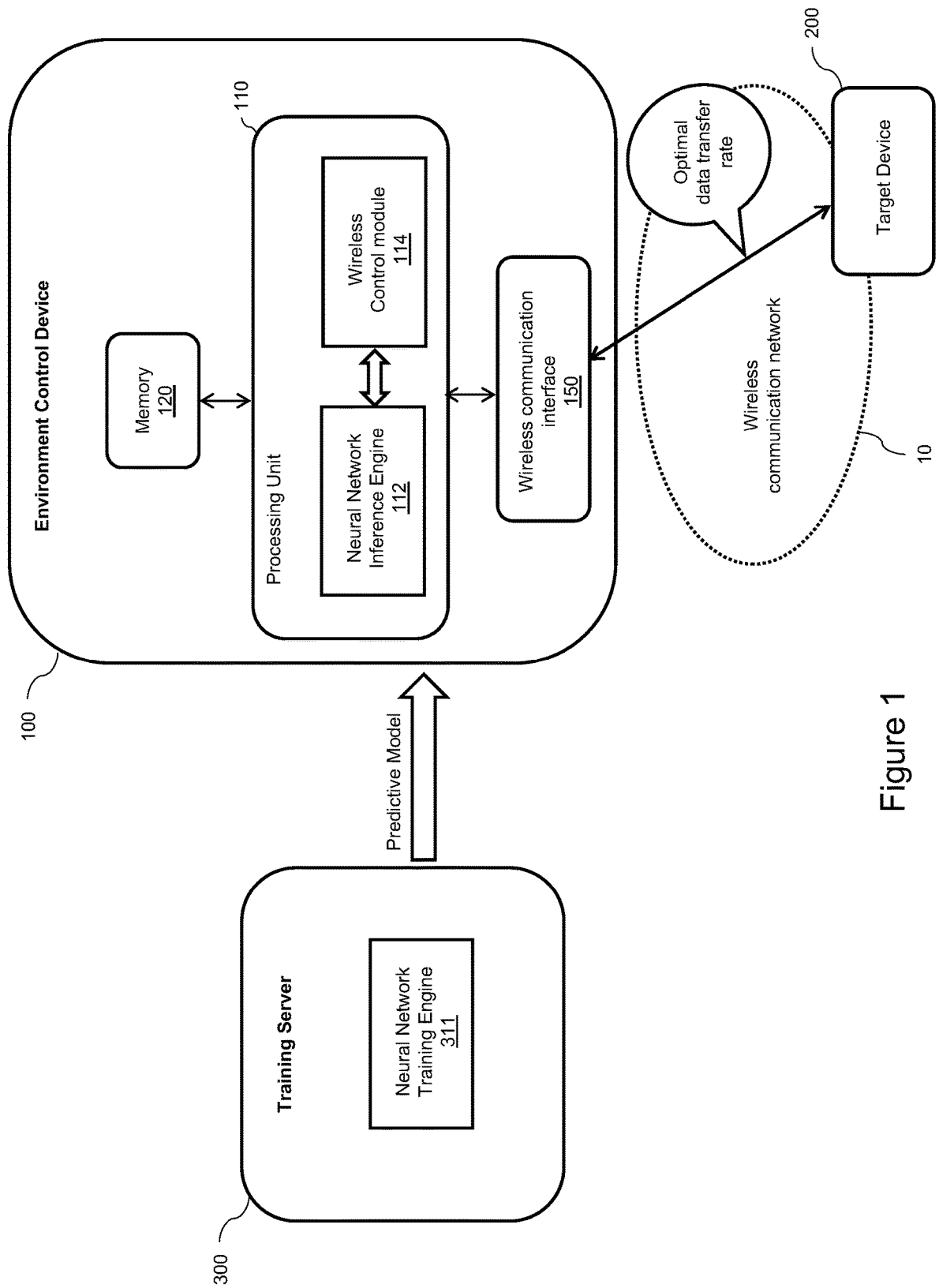
FIG. 1 illustrates a first implementation of an environment control device (ECD) capable of inferring an optimal wireless data transfer rate using a neural network.

The foregoing and other features will become more apparent upon reading of the following non-restrictive description of illustrative embodiments thereof, given by way of example only with reference to the accompanying drawings.

Various aspects of the present disclosure generally address one or more of the problems related to an optimization of a data transfer rate of a wireless communication interface of an environment control device (ECD), for exchanging environmental data with other components of an environment control system via the wireless communication interface.

Terminology

The following terminology is used throughout the present disclosure:
Environment: condition(s) (temperature, pressure, oxygen level, light level, security, etc.) prevailing in a controlled area or place, such as for example in a building.
Environment control system: a set of components which collaborate for monitoring and controlling an environment.
Environmental data: any data (e.g. information, commands) related to an environment that may be exchanged between components of an environment control system.
Environment control device (ECD): generic name for a component of an environment control system. An ECD may consist of an environment controller, a sensor, a controlled appliance, etc.
Environment controller: device capable of receiving information related to an environment and sending commands based on such information.
Environmental characteristic: measurable, quantifiable or verifiable property of an environment.
Environmental characteristic value: numerical, qualitative or verifiable representation of an environmental characteristic.
Sensor: device that detects an environmental characteristic and provides a numerical, quantitative or verifiable representation thereof. The numerical, quantitative or verifiable representation may be sent to an environment controller.
Controlled appliance: device that receives a command and executes the command. The command may be received from an environment controller.
Relay: device capable of relaying an environmental characteristic value from a sensor to an environment controller and/or relaying a command from an environment controller to a controlled appliance.
Environmental state: a current condition of an environment based on an environmental characteristic, each environmental state may comprise a range of values or verifiable representation for the corresponding environmental characteristic.
Wi-Fi: any Wireless Local Area Network (WLAN) product that is based on the Institute of Electrical and Electronics Engineers' (IEEE) 802.11 standards.
Wi-Fi Access Point: communication infrastructure allowing communications between devices using communication protocols based on the 802.11 standards. The Wi-Fi Access Point is established by a dedicated device (e.g. a particular ECD such as an environment controller). A device needs to associate with the Wi-Fi Access Point, before being capable of using it for communications with other devices. The Wi-Fi Access Point gives access to an existing Internet Protocol (IP) network, to which the dedicated device establishing the Wi-Fi Access Point is connected via a communication interface.

Figure 2A:
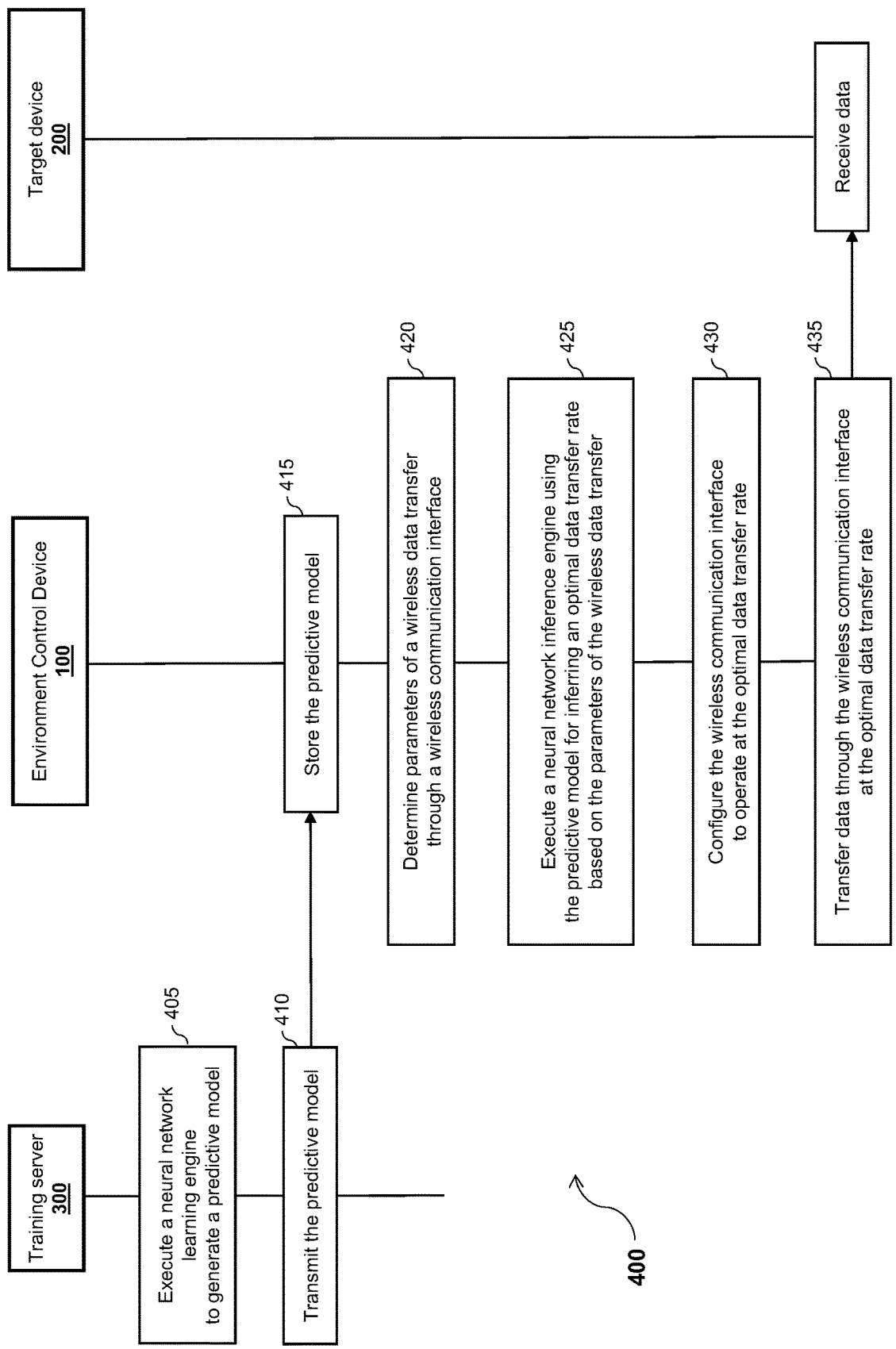
FIGS. 2A and 2B illustrate a first method implemented by the ECD of FIG. 1 for inferring an optimal wireless data transfer rate using a neural network.
Figure 2B:
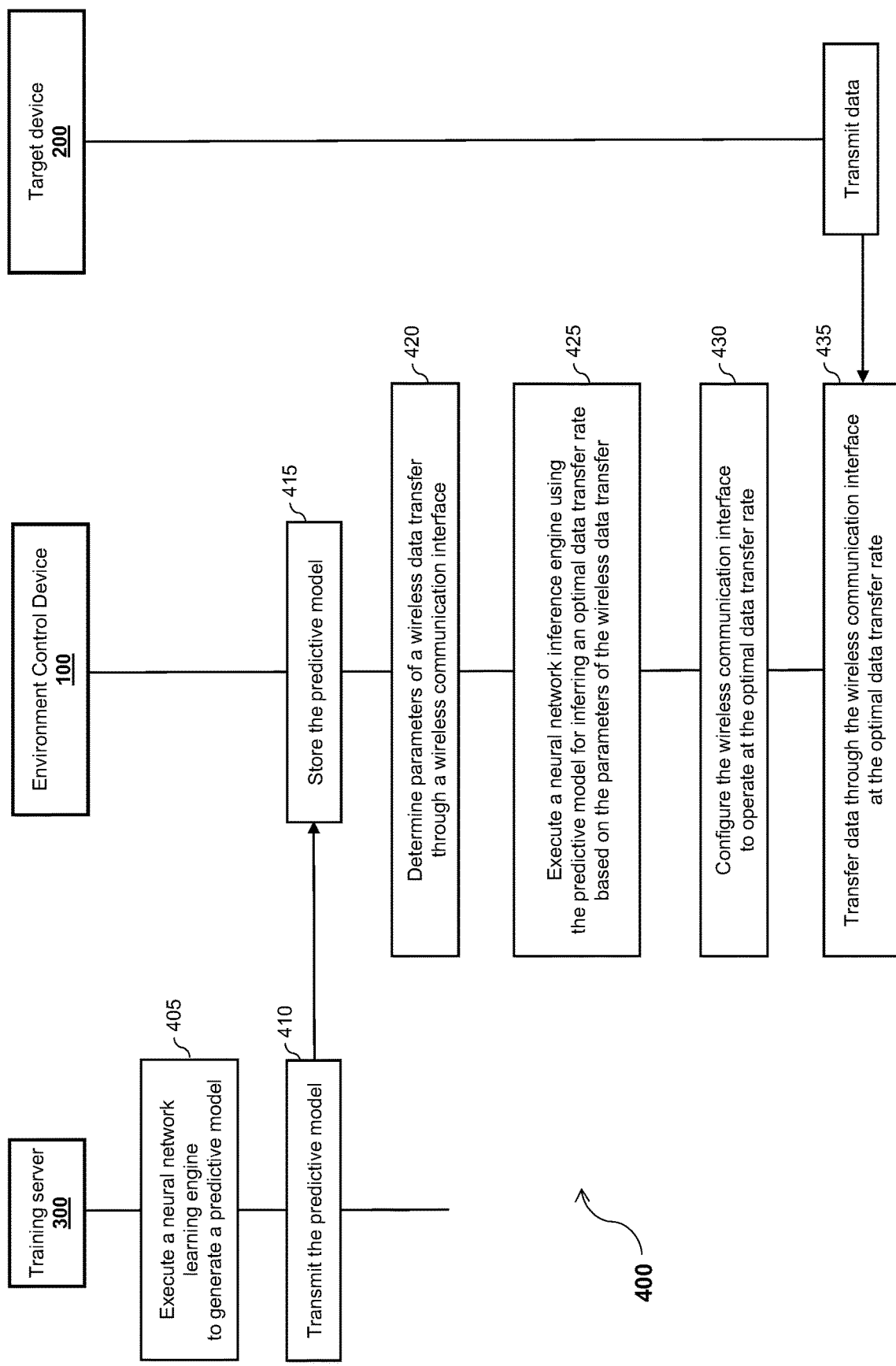

Referring now concurrently to FIGS. 1, 2A and 2B, an environment control device (ECD) 100 (represented in FIG. 1) and a method 400 (represented in FIGS. 2A and 2B) for inferring an optimal wireless data transfer rate using a neural network are illustrated.

The ECD 100 comprises a processing unit 110, memory 120, and a wireless communication interface 150. The ECD 100 may comprise additional components (not represented in FIG. 1 for simplification purposes), such as another communication interface, a user interface, a display, etc.

The processing unit 110 comprises one or more processors (not represented in FIG. 1) capable of executing instructions of a computer program. Each processor may further comprise one or several cores.

The memory 120 stores instructions of computer program(s) executed by the processing unit 110, data generated by the execution of the computer program(s), data received via the wireless communication interface 150 (or another communication interface), etc. Only a single memory 120 is represented in FIG. 1, but the ECD 100 may comprise several types of memories, including volatile memory (such as a volatile Random Access Memory (RAM)) and non-volatile memory (such as a hard drive).

The wireless communication interface 150 allows the ECD 100 to exchange data with one or more target device(s) 200 over a wireless communication network 10. For example, the wireless communication network 10 is a Wi-Fi network, and the wireless communication interface 150 is adapted to support communication protocols used to exchange data over the Wi-Fi network 10. Alternatively, the wireless communication network 10 is a wireless mesh network, and the wireless communication interface 150 is adapted to support communication protocols used to exchange data over the mesh network 10. Other types of wireless communication network 10 may also be supported by the wireless communication interface 150.

At least some of the steps of the method 400 are implemented by the ECD 100, to infer an optimal wireless data transfer rate using a neural network.

A dedicated computer program has instructions for implementing at least some of the steps of the method 400. The instructions are comprised in a non-transitory computer program product (e.g. the memory 120) of the ECD 100. The instructions provide for inferring an optimal wireless data transfer rate using a neural network, when executed by the processing unit 110 of the ECD 100. The instructions are deliverable to the ECD 100 via an electronically-readable media such as a storage media (e.g. CD-ROM, USB key, etc.), or via communication links (e.g. via the wireless communication network 10 through the wireless communication interface 150).

The dedicated computer program product executed by the processing unit 110 comprises a neural network inference engine 112 and a wireless control module 114.

Also represented in FIG. 1 is a training server 300. Although not represented in FIG. 1 for simplification purposes, the training server comprises a processing unit, memory and a communication interface. The processing unit of the training server 300 executes a neural network training engine 311.

The execution of the neural network training engine 311 generates a predictive model, which is transmitted to the ECD 100 via the communication interface of the training server 300. For example, the predictive model is transmitted over the wireless communication network 10 and received via the wireless communication interface 150 of the ECD 100. Alternatively, the predictive model is transmitted over another communication network not represented in FIG. 1 (e.g. a cellular network, a fixed Wide Area Network (WAN), etc.), and received via another communication interface of the ECD 100 not represented in FIG. 1. In still another alternative, the predictive model is transmitted over another communication network not represented in FIG. 1 (e.g. a cellular network, a fixed Wide Area Network (WAN), etc.) connected to the wireless communication network 10, and ultimately received via the wireless communication interface 150 of the ECD 100.

The method 400 comprises the step 405 of executing the neural network learning engine 311 (by the processing unit of the training server 300) to generate the predictive model.

The method 400 comprises the step 410 of transmitting the predictive model to the ECD 100, via the communication interface of the training server 300.

The method 400 comprises the step 415 of storing the predictive model in the memory 120 of the ECD 100. The predictive model is received via the wireless communication interface 150 (or another communication interface not represented in FIG. 1) of the ECD 100, and stored in the memory 120 by the processing unit 110.

The method 400 comprises the step 420 of determining parameters of a data transfer through the wireless communication interface 150. Step 420 is performed by the wireless control module 114 executed by the processing unit 110.

The method 400 comprises the step 425 of executing the neural network inference engine 112 (by the processing unit 110). The neural network inference engine 112 uses the predictive model (stored in memory 120 at step 415) for inferring an optimal data transfer rate based on the parameters of the data transfer through the wireless communication interface (determined at step 420).

The method 400 comprises the step 430 of configuring the wireless communication interface 150 to operate at the optimal data transfer rate (determined at step 425). Step 430 is performed by the wireless control module 114 executed by the processing unit 110.

The method 400 comprises the step 435 of transferring data (over the wireless communication network 10) through the wireless communication interface 150 at the optimal data transfer rate (configured at step 430). FIG. 2A illustrates an example where the optimal data transfer rate is an optimal data transmission rate, and data are transmitted by the ECD 100 to the target device 200 at the optimal data transmission rate. FIG. 2B illustrates another example where the optimal data transfer rate is an optimal data reception rate, and data are received by the ECD 100 from the target device 200 at the optimal data transmission rate. In still another example not represented in the Figures, the optimal data transfer rate is symmetric, and is both an optimal data transmission rate and an optimal data reception rate. Data are both transmitted by the ECD 100 to the target device 200 and received by the ECD 100 from the target device 200 at the symmetric optimal data transfer rate.

Step 420 is then repeated, and if one or more parameters of the data transfer through the wireless communication interface 150 change, then steps 425, 430 are performed before repeating step 435. If the parameters do not change at step 420, then step 435 is simply repeated without performing steps 425, 430. The optimal data transfer rate determined at the last occurrence of step 425 is used for repeating step 435 until a change in the parameters is detected at step 420. Step 420 is repeated on a regular basis, and the time interval between two occurrences of step 420 is a configurable parameter of the algorithm implementing the method 400. Furthermore, configurable thresholds can be used for the parameters at step 420, so that a change in the value of a parameter is not taken into consideration as long as it remains within the boundaries of the corresponding threshold(s). For example, if the parameter is an error rate (as will be illustrated later in the description), the threshold can be an increment of 5% in the error rate. In this case, if the error rate determined at the last occurrence of step 420 is 8%, steps 435 and 420 are repeated (without performing steps 425 and 430) until the error rate determined at step 420 becomes higher than 13% or lower than 3% (in which case steps 425 and 430 are performed).

Figure 3:
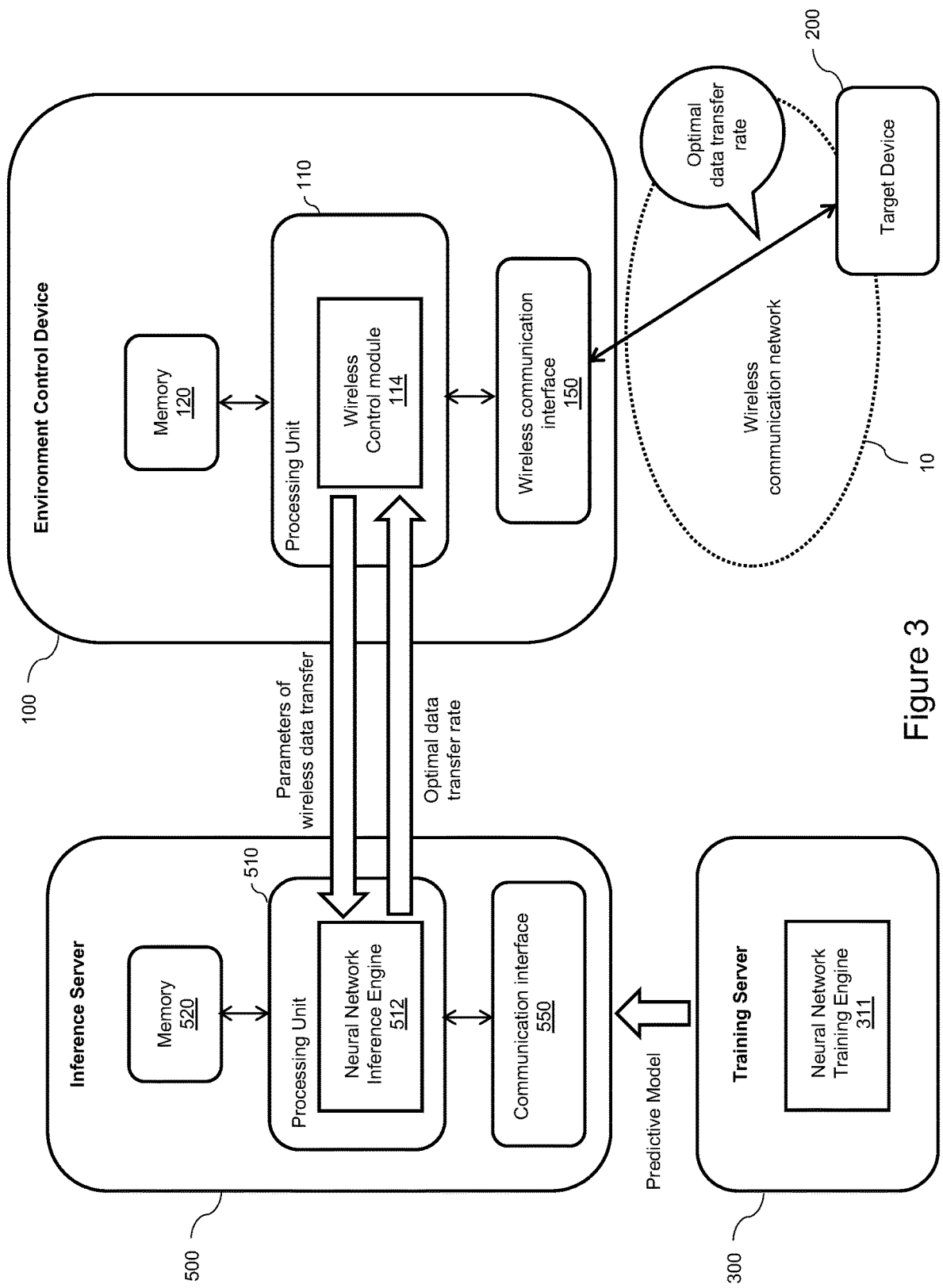
FIG. 3 illustrates a second implementation of an ECD capable of inferring an optimal wireless data transfer rate using a neural network.
Figure 4B:
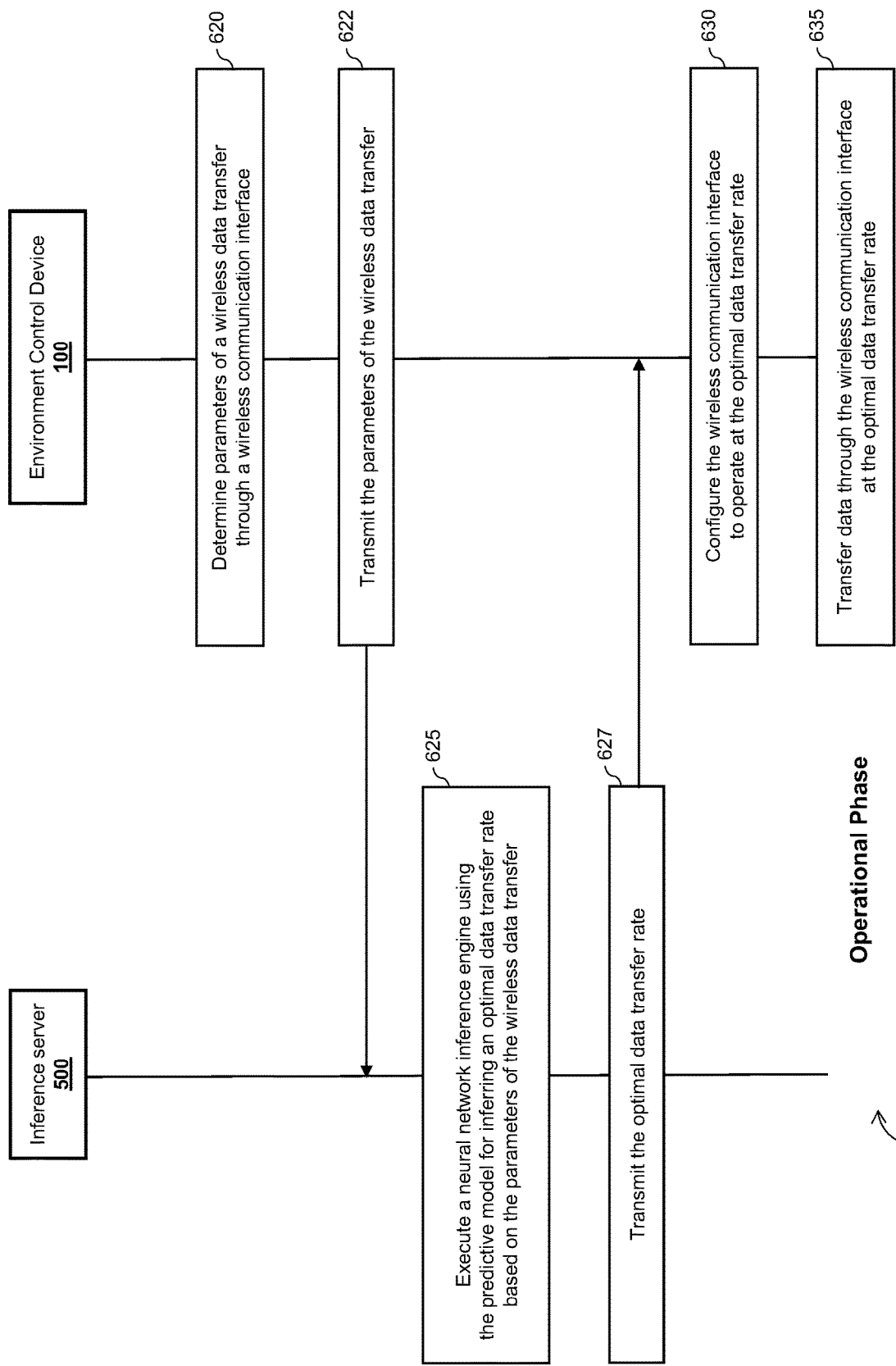

Reference is now made concurrently to FIGS. 3, 4A and 4B, where FIG. 3 represents an alternative configuration of the ECD 100 of FIG. 1, and FIGS. 4A-B represent another method 600 for inferring an optimal wireless data transfer rate using a neural network.

The ECD 100 represented in FIG. 3 is similar to the ECD 100 represented in FIG. 1, except for the processing unit 110 not executing the neural network inference engine and the memory 120 not storing the predictive model generated by the training server 300. The training server 300 represented in FIG. 3 is similar to the training server 300 represented in FIG. 1.

At least some of the steps of the method 600 are implemented by the ECD 100, to infer an optimal wireless data transfer rate using a neural network.

A dedicated computer program has instructions for implementing at least some of the steps of the method 600. The instructions are comprised in a non-transitory computer program product (e.g. the memory 120) of the ECD 100. The instructions provide for inferring an optimal wireless data transfer rate using a neural network, when executed by the processing unit 110 of the ECD 100. The instructions are deliverable to the ECD 100 via an electronically-readable media such as a storage media (e.g. CD-ROM, USB key, etc.), or via communication links (e.g. via the wireless communication network 10 through the wireless communication interface 150).

The dedicated computer program product executed by the processing unit 110 comprises the wireless control module 114 (but not the neural network inference engine 112 represented in FIG. 1).

Also represented in FIG. 3 is an inference server 500. The inference server 500 comprises a processing unit 510, memory 520 and a communication interface 550. The processing unit 510 of the inference server 500 executes a neural network inference engine 512 similar to the neural network inference engine 112 represented in FIG. 1.

The execution of the neural network training engine 311 on the training server 300 generates the predictive model, which is transmitted to the inference server 500 via the communication interface of the training server 300. The predictive model is received via the communication interface 550 of the interference server 500 and stored in the memory 520.

A single server may be used for implementing the neural network training engine 311 and the neural network inference engine 512. A processing unit of the single server executes a neural network performing the neural network training engine 311 during a learning phase, and the neural network inference engine 512 during an operational phase.

The inference server 500 and the ECD 100 exchange operational data (the parameters of a wireless data transfer transmitted from the ECD 100 to the inference server 500, and an optimal data transfer rate transmitted from the inference server 500 to the ECD 100), as will be detailed in the description of the method 600. For example, the operational data are exchanged over the wireless communication network 10 and transmitted/received via the wireless communication interface 150 of the ECD 100. Alternatively, the operational data are exchanged over another communication network not represented in FIG. 3 (e.g. a cellular network, a fixed Wide Area Network (WAN), etc.), and transmitted/received via another communication interface of the ECD 100 not represented in FIG. 3. In still another alternative, the operational data are exchange over another communication network not represented in FIG. 3 (e.g. a cellular network, a fixed Wide Area Network (WAN), etc.) connected to the wireless communication network 10, and ultimately transmitted/received via the wireless communication interface 150 of the ECD 100. The operational data are transmitted/received via the communication interface 550 of the inference server 500.

The method 600 comprises the step 605 of executing the neural network learning engine 311 (by the processing unit of the training server 300) to generate the predictive model.

The method 600 comprises the step 410 of transmitting the predictive model to the inference server 500, via the communication interface of the training server 300.

The method 600 comprises the step 615 of storing the predictive model in the memory 520 of the inference server 500. The predictive model is received via the communication interface 550 of the inference server 500, and stored in the memory 520 by the processing unit 510.

The method 600 comprises the step 620 of determining parameters of a data transfer through the wireless communication interface 150 of the ECD 100. Step 420 is performed by the wireless control module 114 executed by the processing unit 110 of the ECD 100.

The method 600 comprises the step 622 of transmitting the parameters of the data transfer through the wireless communication interface 150 (determined at step 620) to the inference server 500. As mentioned previously, the parameters of the data transfer are transmitted via the wireless communication interface 150 or via another communication interface of the ECD 100.

The method 600 comprises the step 625 of executing the neural network inference engine 512 by the processing unit 510 of the inference server 500. The neural network inference engine 512 uses the predictive model (stored in memory 520 at step 615) for inferring an optimal data transfer rate based on the parameters of the data transfer through the wireless communication interface (determined at step 620 and transmitted at step 622). As mentioned previously, the parameters of the data transfer are received via the communication interface 550 of the inference server 500.

The method 600 comprises the step 627 of transmitting the optimal data transfer rate (determined at step 625) to the ECD 100. As mentioned previously, the optimal data transfer rate is transmitted via the communication interface 550 of the inference server 500.

The method 600 comprises the step 630 of configuring the wireless communication interface 150 of the ECD 100 to operate at the optimal data transfer rate (determined at step 625 and transmitted at step 627). Step 630 is performed by the wireless control module 114 executed by the processing unit 110 of the ECD 100. As mentioned previously, the optimal data transfer rate is received via the wireless communication interface 150 or via another communication interface of the ECD 100.

The method 600 comprises the step 635 of transferring data (over the wireless communication network 10) through the wireless communication interface 150 at the optimal data transfer rate (configured at step 630). In a first example, the optimal data transfer rate is an optimal data transmission rate, and data are transmitted by the ECD 100 to the target device 200 at the optimal data transmission rate. In another example, the optimal data transfer rate is an optimal data reception rate, and data are received by the ECD 100 from the target device 200 at the optimal data transmission rate.

In still another example, the optimal data transfer rate is symmetric, and is both an optimal data transmission rate and an optimal data reception rate. Data are both transmitted by the ECD 100 to the target device 200 and received by the ECD 100 from the target device 200 at the symmetric optimal data transfer rate.

Step 620 is then repeated, and if one or more parameters of the data transfer through the wireless communication interface 150 change, then steps 622, 625, 627, 630 are performed before repeating step 635. If the parameters do not change at step 620, then step 635 is simply repeated without performing steps 622, 625, 627, 630. The optimal data transfer rate determined at the last occurrence of step 625 is used for repeating step 635 until a change in the parameters is detected at step 620. Step 620 is repeated on a regular basis, and the time interval between two occurrences of step 620 is a configurable parameter of the algorithm implementing the method 600. Furthermore, configurable thresholds can be used for the parameters at step 620, so that a change in the value of a parameter is not taken into consideration as long as it remains within the boundaries of the corresponding threshold(s).

A proprietary communication protocol may be used for exchanging data between the inference server 500 and the ECD 100 at steps 622 and 627. Although not represented in FIG. 4B for simplification purposes, the inference server 500 exchanges data with a plurality of ECDs 100 under its control (at steps 622 and 627), as will be illustrated later in the description in relation to FIG. 7. Alternatively, the inference server 500 executes a web server and each of the plurality of ECDs 100 executes a web client, and the exchange of data at steps 622 and 627 use the Hypertext Transfer Protocol (HTTP) or Hypertext Transfer Protocol Secure (HTTPS) protocol, as is well known in the art.

Reference is now made to FIG. 3, and more particularly to the neural network inference engine 512 and the neural network training engine 311. However, the following also applies to the neural network inference engine 112 of FIG. 1.

Various types of parameters of a data transfer through the wireless communication interface 150 may affect the achievable data transfer rate for this data transfer. The present disclosure aims at providing a mechanism for inferring an optimal data transfer rate which is as close as possible to the achievable data transfer rate. Thus, the present disclosure provides a mechanism for avoiding the following: try to transfer data at the highest data transfer rate possible, realize that this highest data transfer rate is not sustainable, and downgrade the data transfer rate to a more sustainable value. Instead, the mechanism disclosed in the present disclosure takes advantage of the neural network technology to directly "guess" the achievable data transfer rate.

Following are examples of parameters of a data transfer through the wireless communication interface 150, which are used as inputs of the neural network training engine 311 (during a training phase) and the neural network inference engine 512 (during an operational phase).

One parameter is the radio frequency at which the wireless communication interface 150 is operating. This radio frequency varies from one wireless technology to another (e.g. Wi-Fi or mesh). This radio frequency also varies for different standards of the same wireless technology (e.g. 802.11ac versus 802.11n for Wi-Fi). This radio frequency may also vary for the same standard (e.g. 20 or 40 megahertz (MHz) for the 802.11n), allowing the wireless communication interface 150 to operate at various radio frequencies.

Another parameter is the signal strength of the radio signal transmitted or received by the wireless communication interface 150. The signal strength can be measured by a driver of the wireless communication interface 150. For example, for Wi-Fi, the signal strength is represented as a quality in percentage. Alternatively, the signal strength is represented as a received signal strength indicator (RSSI) expressed in dBm (power ratio in decibels (dB) of the measured power referenced to one milliwatt (mW).

Still another parameter is the error rate. For example, for Wi-Fi, the driver of the wireless communication interface 150 measures a Packet Error Rate (PER) or a Bit Error Rate (BER). The error rate can be measured for a given interval, for instance the last 10 seconds, the last 30 seconds, the last minute, etc. Alternatively, the error rate can be measured for an amount of data transmitted and/or received, for instance the last N kilobytes, the last N Megabytes, etc. (where N is an integer).

Yet another parameter is the amount of data to be transmitted and/or received, which may have an impact on the achievable data transfer rate (possibly in combination with other parameters).

Still another parameter is the period of time (e.g. time and/or day) at which the data transfer occurs. Patterns may be discovered by a neural network for a group of ECDs 100 located in the same building, or in a specific section of the building. For example, a higher data transfer rate can be achieved at night, at specific periods of time during the day, during the week end, etc.

A person skilled in the art would readily understand that additional parameters may have an impact on the achievable data transfer rate, and can also be taken into consideration by the neural network inference engine 512 and the neural network training engine 311. Furthermore, a combination of the aforementioned parameters is taken into consideration by the neural network inference engine 512 and the neural network training engine 311. The best combination can be determined during the learning phase with the neural network training engine 311. The best combination may depend on the type of wireless technology (e.g. Wi-Fi or mesh), of a particular standard within a given wireless technology (e.g. 802.11ac versus 802.11n for Wi-Fi), of a particular location of the ECDs 100 (e.g. within a particular building, within a particular section of the building, etc.). The training phase can be used to identify the best combination of parameters, and only those parameters will be used by the neural network training engine 311 to generate the predictive model used by the neural network inference engine 512. Alternatively, all the available parameters can be used by the neural network training engine 311 to generate the predictive model. In this case, the neural network training engine 311 will simply learn to ignore the parameters which do not have a significant influence on the achievable data transfer rate.

During the learning phase, the neural network training engine 311 is trained with a plurality of inputs corresponding to the parameters of a data transfer through the wireless communication interface 150 and a corresponding plurality of outputs corresponding to the optimal data transfer rate. As is well known in the art of neural network, during the training phase, the neural network implemented by the neural network training engine 311 adjusts its weights. Furthermore, during the learning phase, the number of layers of the neural network and the number of nodes per layer can be adjusted to improve the accuracy of the model. At the end of the training phase, the predictive model generated by the neural network training engine 311 includes the number of layers, the number of nodes per layer, and the weights.

The inputs and outputs for the learning phase of the neural network can be collected through an experimental process. For example, a test ECD 100 is placed in various operating conditions corresponding to various values of the parameters of a data transfer through the wireless communication interface 150. For each set of values of the parameters, the optimal data transfer rate is determined and used as the output for the neural network.

Alternatively, the inputs and outputs for the learning phase of the neural network can be collected through a mechanism for collecting data while the ECD 100 is operating in real conditions. For example, a collecting software is executed by the processing unit 110 of the ECD 100. The collecting software records various operating conditions corresponding to various values of the parameters of a data transfer through the wireless communication interface 150. For each set of values of the parameters, the collecting software records the optimal data transfer rate as determined by the driver of the wireless communication interface 150. As mentioned previously, the optimal data transfer rate is determined by the driver of the wireless communication interface 150 by a sub-optimal procedure consisting in trying various decreasing data transfer rates, until a data transfer rate can be effectively sustained with the current operating conditions of the wireless communication interface 150.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement learning, etc.

During the operational phase, the neural network inference engine 512 uses the predictive model (e.g. the values of the weights) determined during the learning phase to infer an output (optimal data transfer rate) based on inputs (parameters of a data transfer through the wireless communication interface 150), as is well known in the art.

The set of values for the optimal data transfer rate varies for each wireless technology (e.g. Wi-Fi and mesh), and for different standards of the same wireless technology (e.g. 802.11ac versus 802.11n for Wi-Fi). For example, the optimal data transfer is selected within a continuous range of values, for example within the range 2 to 20 Mhz. Alternatively, the optimal data transfer is selected among a set of discrete values. For example, for the 802.11ac standard, the optimal data transfer can be selected among the following values: 200, 400, 433, 600 and 867 Megabits per second (Mbps). For the 802.11n standard, the optimal data transfer can be selected among the following values: 1, 2, 5.5, 6, 9, 11, 12, 18, 24, 36, 48 and 54 Mbps.

Furthermore, in some cases, the optimal data transfer rate is symmetric: the same value is used for transmitting (optimal data transmission rate) and receiving data (optimal data reception rate). Alternatively, the optimal data transfer rate is asymmetric: a first value is used for transmitting (optimal data transmission rate) and a second value is used for receiving data (optimal data reception rate).

Reference is now made concurrently to FIGS. 5A, 5B, 5C, 5D and 5E, which illustrate exemplary environment control systems where the methods 400 and 600 are applied. The ECD 100 represented in FIGS. 5A, 5B, 5C, 5D and 5E corresponds to either the ECD 100 represented in FIG. 1 (with the neural network inference engine 112 and the wireless control module 114), or the ECD 100 represented in FIG. 3 (with only the wireless control module 114). The optimal data transfer rate of the wireless communication interface 150 is determined via either the method 400 or the method 600. The training server 300 of FIGS. 1 and 3, and the inference server 500 of FIG. 3, are not represented for simplification purposes.

The environment control systems represented in FIGS. 5A-E include various types of ECDs, such as environment controllers, sensors, controlled appliances, relays, etc. These ECDs interact in a manner well known in the art of environment control systems.

For example, a sensor detects an environmental characteristic and transmits corresponding environmental data (e.g. an environmental characteristic value) to an environment controller. Alternatively, a relay is used between the sensor and the environment controller, and the environmental data are received by the relay (via a first communication interface of the relay), and forwarded by the relay to the environment controller (via a second communication interface of the relay). The environment controller receives an environmental characteristic value from the sensor, and determines an environmental state based on the received environmental characteristic value. Then, the environment controller generates a command based on the environmental state, and transmits the command to a controlled appliance. The environmental characteristic value may be immediately processed upon reception by the environment controller, to generate the command. Alternatively, the environmental characteristic value may be stored in a memory of the environment controller, and processed later by the environment controller to generate the command. A command may also be generated based on several received environmental characteristic values. Alternatively, the relay is used between the environment controller and the controlled appliance, and the command is received by the relay (via the second communication interface of the relay), and forwarded by the relay to the controlled appliance (via the first communication interface of the relay).

Figure 5A:
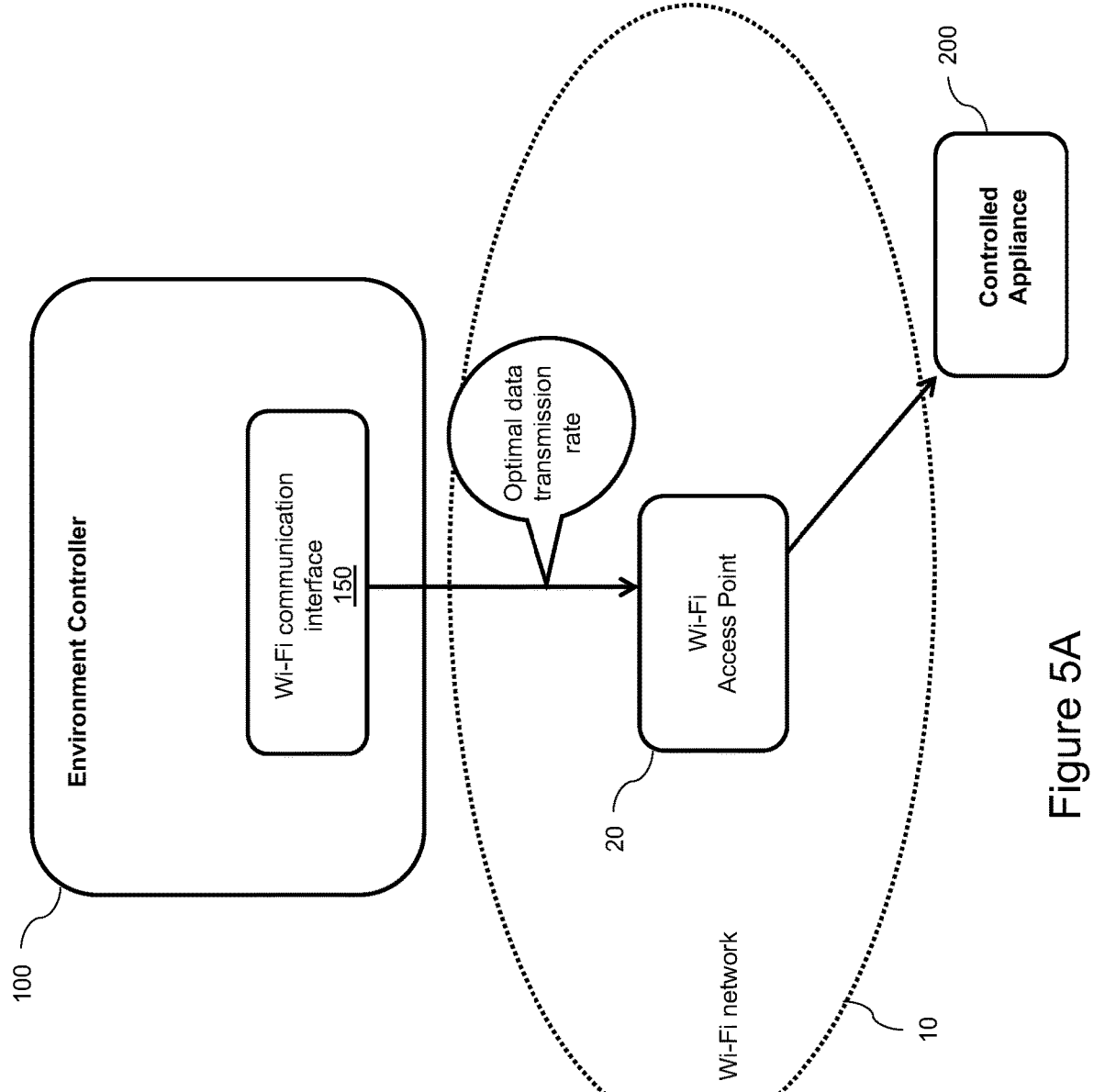
FIGS. 5A, 5B, 5C, 5D and 5E illustrate examples of ECDs implementing the methods illustrated in FIG. 2A-B or 4A-B.

FIG. 5A illustrates a first configuration where the ECD 100 is an environment controller, and where the wireless communication interface 150 is a Wi-Fi communication interface. The wireless communication network 10 is a Wi-Fi network comprising a Wi-Fi access point 20. The target device 200 is a controlled appliance. The optimal data transfer rate is an optimal data transmission rate. The environment controller 100 transmits data (e.g. one or more commands) to the controlled appliance 200 via the Wi-Fi access point 20. The Wi-Fi communication interface 150 is configured to operate at the optimal data transmission rate for transmitting data to the Wi-Fi access point 20.

Figure 5B:
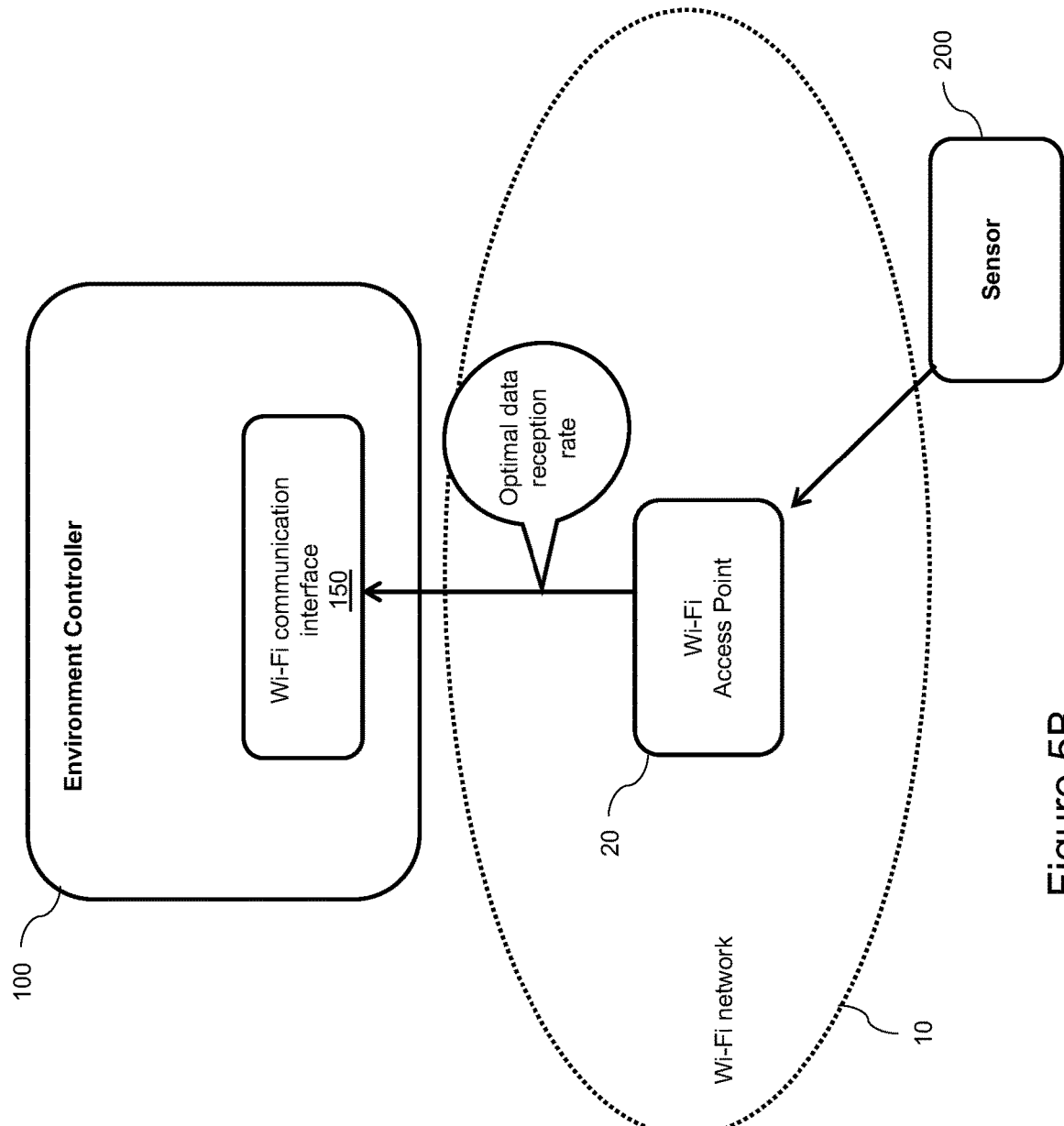

FIG. 5B illustrates a second configuration where the ECD 100 is an environment controller, and where the wireless communication interface 150 is a Wi-Fi communication interface. The wireless communication network 10 is a Wi-Fi network comprising the Wi-Fi access point 20. The target device 200 is a sensor. The optimal data transfer rate is an optimal data reception rate. The environment controller 100 receives data (e.g. one or more environmental characteristic values) from the sensor 200 via the Wi-Fi access point 20. The Wi-Fi communication interface 150 is configured to operate at the optimal data reception rate for receiving data from the Wi-Fi access point 20.

Figure 5C:
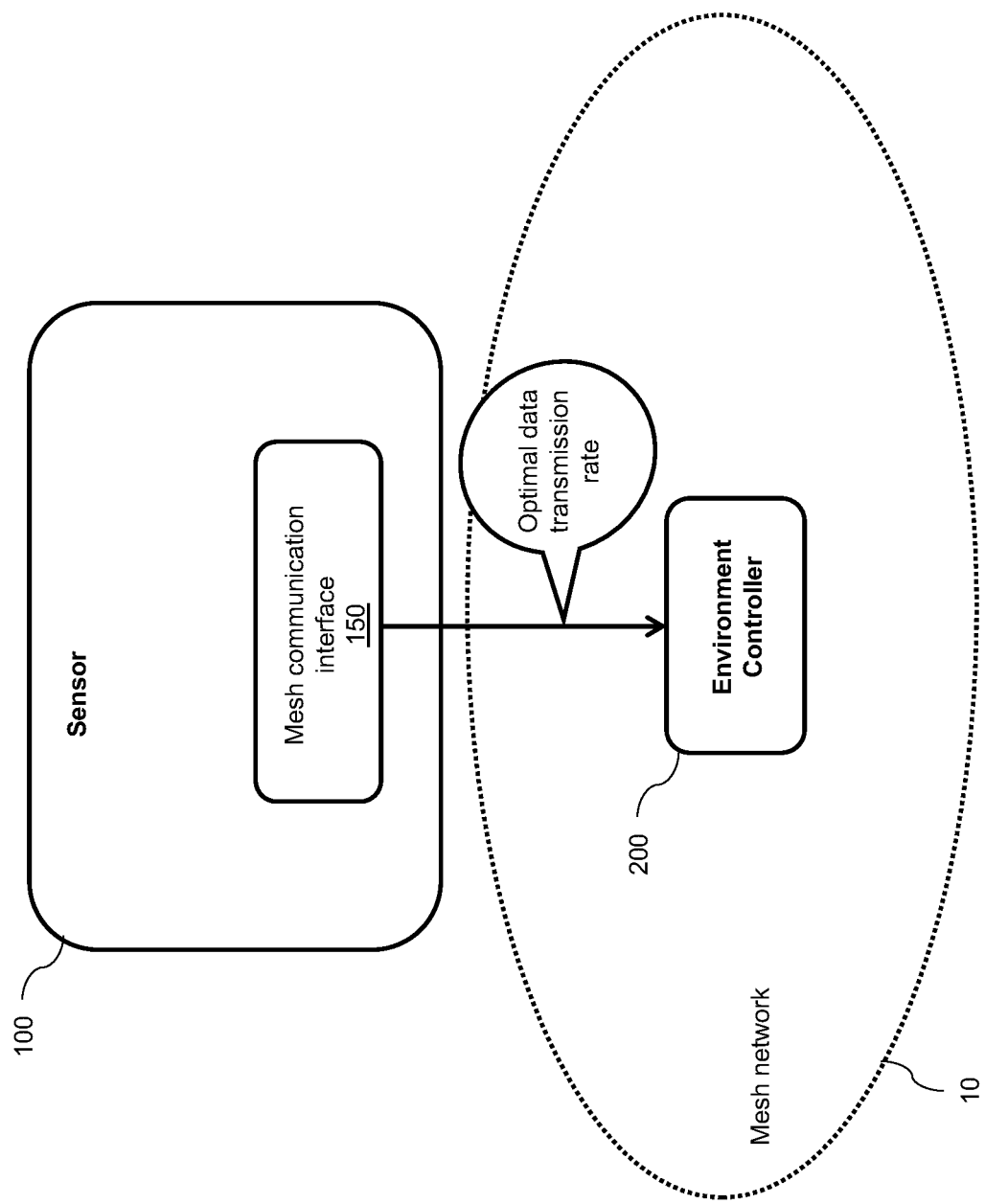

FIG. 5C illustrates a third configuration where the ECD 100 is a sensor, and where the wireless communication interface 150 is a mesh communication interface. The wireless communication network 10 is a mesh network. The target device 200 is an environment controller. The optimal data transfer rate is an optimal data transmission rate. The sensor 100 directly transmits data (e.g. one or more environmental characteristic values) to the environment controller 200. The mesh communication interface 150 is configured to operate at the optimal data transmission rate for directly transmitting data to the environment controller 200.

An example of sensor 100 for which the determination of the optimal data transfer rate is particularly useful is a camera. A camera generates a large amount of data, and trying to transmit these data at a transmission rate which is not adapted (too high) to the current operating conditions of the wireless network 10 may significantly deteriorate the effectively achieved data transmission rate.

Figure 5D:
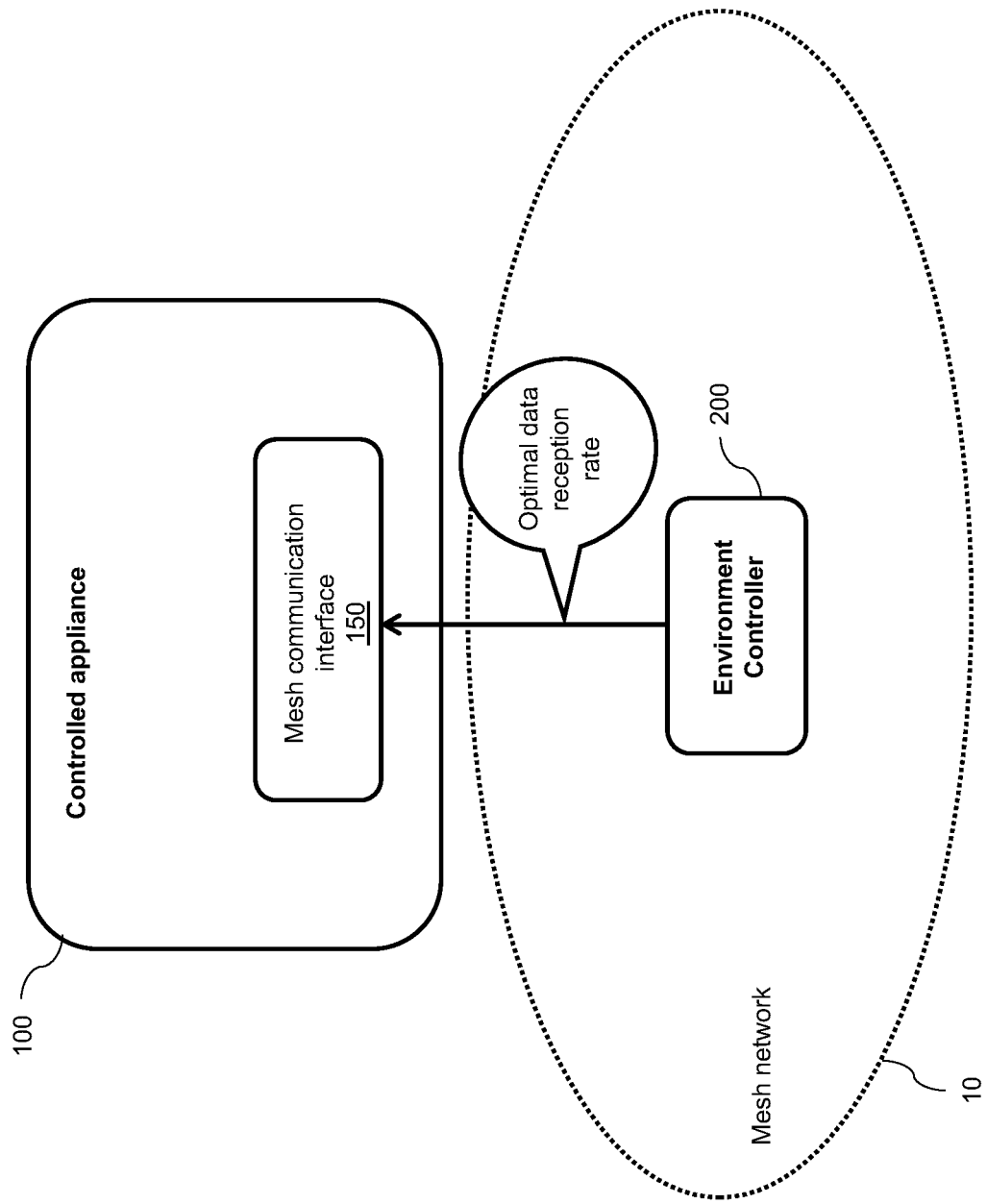

FIG. 5D illustrates a fourth configuration where the ECD 100 is a controlled appliance, and where the wireless communication interface 150 is a mesh communication interface. The wireless communication network 10 is a mesh network. The target device 200 is an environment controller. The optimal data transfer rate is an optimal data reception rate. The controlled appliance 100 directly receives data (e.g. one or more commands) from the environment controller 200. The mesh communication interface 150 is configured to operate at the optimal data reception rate for directly receiving data from the environment controller 200.

Figure 5E:
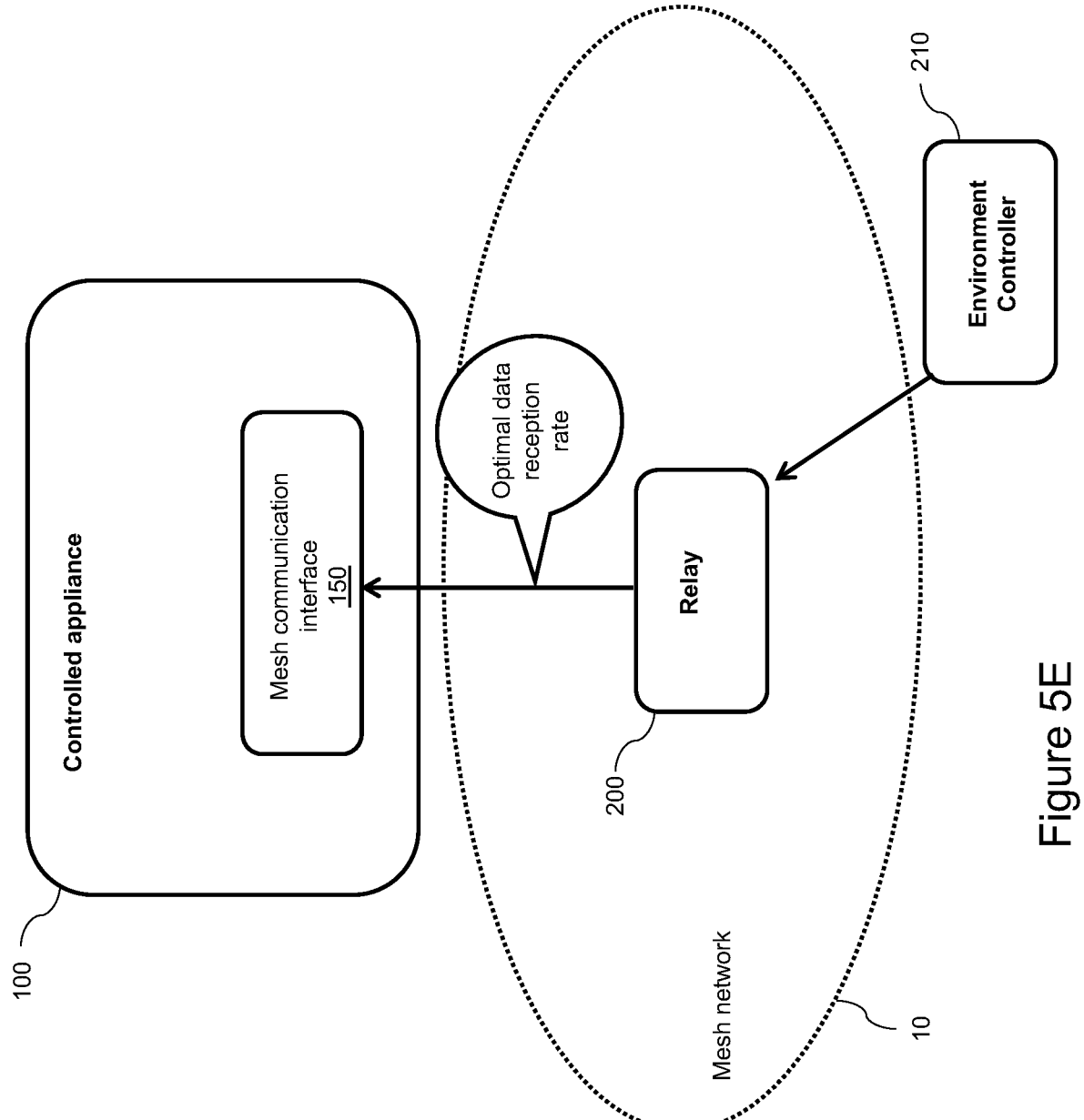

FIG. 5E illustrates a fifth configuration where the ECD 100 is a controlled appliance, and where the wireless communication interface 150 is a mesh communication interface. The wireless communication network 10 is a mesh network. The target device 200 is an environment controller. The optimal data transfer rate is an optimal data reception rate. The controlled appliance 100 directly receives data (e.g. one or more commands) from the relay 200. The data are generated by an environment controller 210 and transmitted to the relay 200, and further forwarded by the relay 200 to the controlled appliance 100. The mesh communication interface 150 is configured to operate at the optimal data reception rate for directly receiving the data from the relay 200.

A person skilled in the art would readily understand that other configurations of an environment control system can be supported by implementing the methods 400 or 600. For example, with respect to FIGS. 5A and 5B, the Wi-Fi network 10 comprising the Wi-Fi Access Point 20 can be replaced by a mesh network, and the Wi-Fi communication interface 150 can be replaced by a mesh communication interface. Similarly, with respect to FIGS. 5C, 5D and 5E, the mesh network 10 can be replaced by a Wi-Fi network comprising a Wi-Fi Access Point, and the mesh communication interface 150 can be replaced by a Wi-Fi communication interface. Furthermore, FIGS. 5A and 5B can be combined, the Wi-Fi communication interface 150 (or alternatively a mesh communication interface) being configured to operate simultaneously at an optimal data transmission rate (for transmitting data to the controlled appliance 200 of FIG. 5A) and an optimal data reception rate (for receiving data from the sensor 200 of FIG. 5B). In a particular case, a symmetric optimal data transfer rate is configured in place of independent data transmission and data reception rates.

With respect to FIG. 5A, the ECD 100 may transmit data to a plurality of controlled appliances 200 via the Wi-Fi Access Point 20. The optimal data transmission rate applies to any transmission of data to one of the plurality of controlled appliances 200 via the Wi-Fi Access Point 20.

With respect to FIG. 5B, the ECD 100 may receive data from a plurality of sensors 200 via the Wi-Fi Access Point 20. The optimal data reception rate applies to any reception of data from one of the plurality of the sensors 200 via the Wi-Fi Access Point 20.

With respect to FIG. 5C, the sensor 100 may transmit data to a plurality of ECDs 200 over the mesh network 20. The optimal data transmission rate applies to any transmission of data to one of the plurality of ECDs 200 over the mesh network 20.

With respect to FIG. 5D, the controlled appliance 100 may receive data to a plurality of ECDs 200 over the mesh network 20. The optimal data reception rate applies to any reception of data from one of the plurality of ECDs 200 over the mesh network 20.

With respect to FIGS. 5A and 5B, the Wi-Fi communication interface 150 may alternatively use the Wi-Fi Direct standard to directly transmit data to the controlled appliance 200 in FIG. 5A, and to directly received data from the sensor 200 in FIG. 5B, without using the intermediate Wi-Fi Access Point 20. Wi-Fi Direct is a Peer-to-Peer Wi-Fi technology functionally similar to the mesh technology illustrated in FIGS. 5C, 5D and 5E.

Reference is now made concurrently to FIGS. 1, 2A, 2B and 6, which illustrate the usage of the method 400 in a large environment control system.

A first plurality of ECDs 100 implementing the method 400 are deployed at a first location. Only two ECDs 100 are represented for illustration purposes, but any number of ECDs 100 may be deployed.

A second plurality of ECDs 100 implementing the method 400 are deployed at a second location. Only one ECD 100 is represented for illustration purposes, but any number of ECDs 100 may be deployed.

The first and second locations may consist of different buildings, different floors of the same building, etc. Only two locations are represented for illustration purposes, but any number of locations may be considered.

The ECDs 100 correspond to the ECDs represented in FIG. 1, and execute both the wireless control module 114 and the neural network inference engine 112. Each ECD 100 receives a predictive model from the centralized training server 300 (e.g. a cloud based training server 300 in communication with the ECDs 100 via a networking infrastructure, as is well known in the art). The same predictive model is used for all the ECDs. Alternatively, a plurality of predictive models is generated, and takes into account specific operating conditions of the ECDs 100. For example, a first predictive model is generated for the ECDs using a Wi-Fi communication interface 150, and a second predictive model is generated for the ECDs using a mesh communication interface 150. Furthermore, different predictive models can be generated for different implementations of the same networking technology (e.g. different predictive models for different implementations of the Wi-Fi protocols, and different predictive models for different implementations of the mesh protocols).

Figure 6:
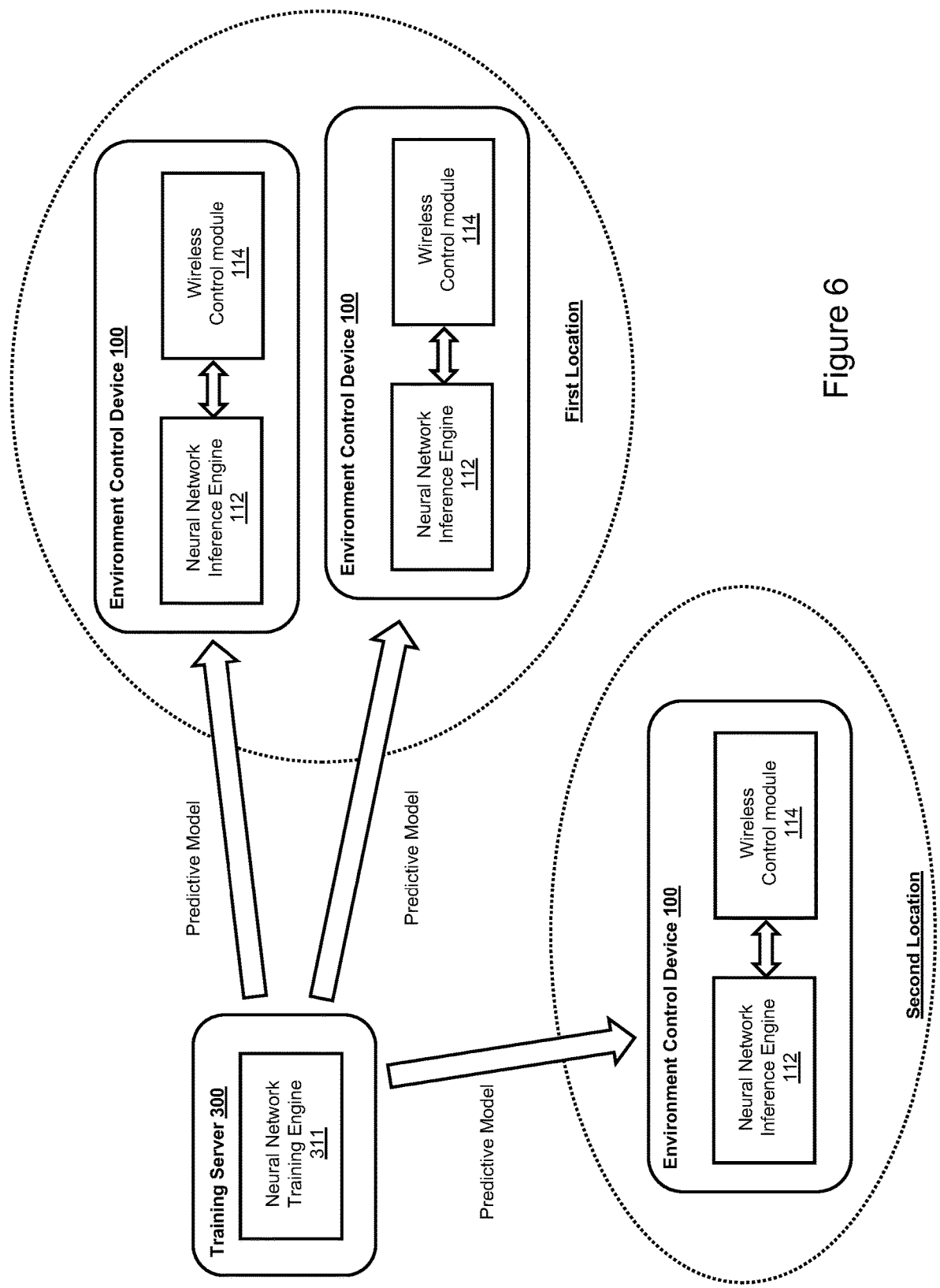
FIG. 6 represents an environment control system where ECDs implementing the method illustrated in FIGS. 2A-B are deployed.

FIG. 6 illustrates a decentralized architecture, where the ECDs 100 take autonomous decisions for optimizing the data transfer rate of the wireless communication interface 150, using the predictive model as illustrated in the method 400.

Reference is now made concurrently to FIGS. 3, 4A, 4B and 7, which illustrate the usage of the method 600 in a large environment control system.

Figure 7:
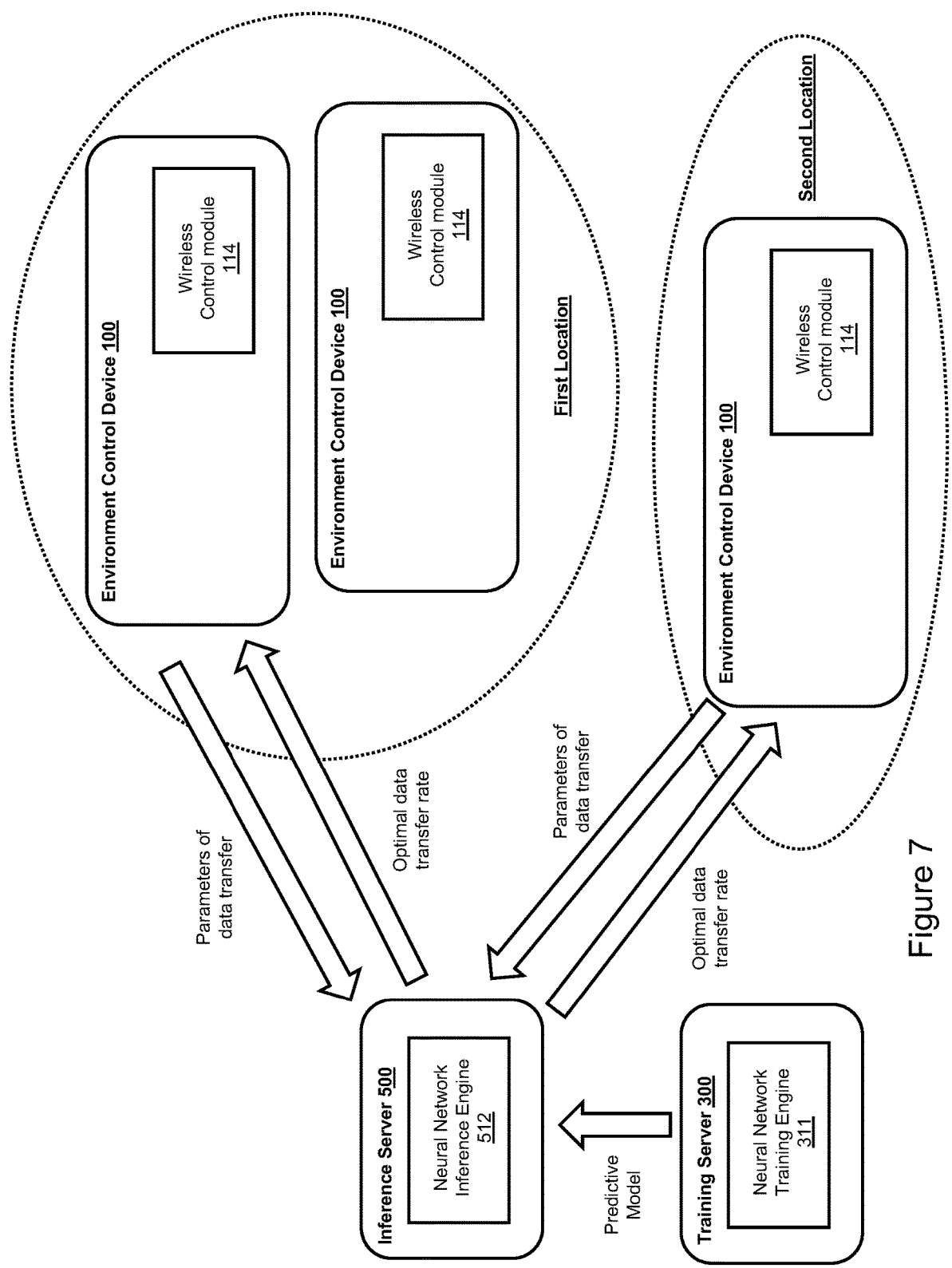
FIG. 7 represents an environment control system where ECDs implementing the method illustrated in FIGS. 4A-B are deployed.

FIG. 7 is similar to FIG. 6 with respect to the locations (e.g. first and second locations) where the ECDs 100 are deployed. However, the ECDs 100 correspond to the ECDs represented in FIG. 3, implement the method 600, and only execute the wireless control module 114

The predictive model is generated by the training server 300 and transmitted to the inference server 500, which uses the predictive model to execute the neural network inference engine 512. As mentioned previously, the training server 300 and the inference server 500 can be collocated on the same computing device.

Each ECD 100 transmits the parameters of a data transfer to the inference server 500, and receives in response the optimal data transfer rate from the centralized inference server 500 (e.g. a cloud based inference server 500 in communication with the ECDs 100 via a networking infrastructure, as is well known in the art). As mentioned previously in relation to FIG. 6, the same predictive model is used for all the ECDs; or alternatively, a plurality of predictive models is generated, and takes into account specific operating conditions of the ECDs 100.

FIG. 7 illustrates a centralized architecture, where the ECDs 100 do not take autonomous decisions for optimizing the data transfer rate of the wireless communication interface 150, but receive the optimized data transfer rate from the centralized inference server 550 (which uses the predictive model as illustrated in the method 600).

The present disclosure focuses on ECDs for implementing the methods (e.g. 400 in FIGS. 2A-B and 600 in FIGS. 4A-4B) consisting in inferring an optimal wireless data transfer rate using a neural network. However, other types of computing devices with a processing unit, memory and a wireless communication interface can benefit from the present methods. These computing devices implement the methods 400 and 600 in the same manner than the ECD 100 represented in FIGS. 1, 3, 5A-5E, 6 and 7.

Figure 8:
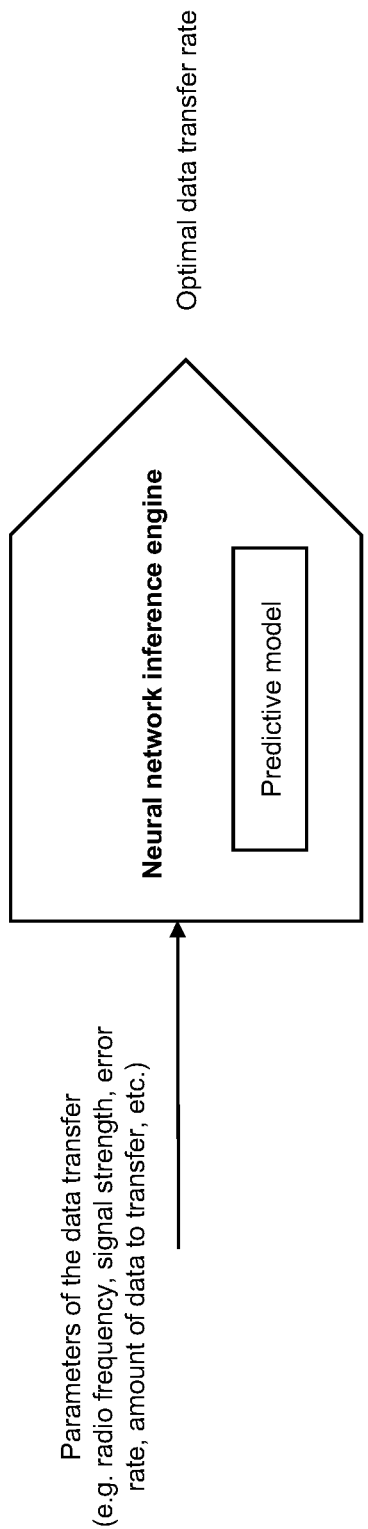
FIG. 8 is a schematic representation of a neural network inference engine executed by the ECD of FIG. 1 and an inference server of FIG. 3.

Reference is now made to FIG. 8, which illustrates the aforementioned neural network inference engine with its inputs and its output. FIG. 8 corresponds to the neural network inference engine 112 executed at step 425 of the method 400, as illustrated in FIGS. 1, 2A and 2B. FIG. 8 also corresponds to the neural network inference engine 512 executed at step 625 of the method 600, as illustrated in FIGS. 3 and 4B.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device, comprising:
a wireless communication interface; and
a processing unit comprising one or more processors for:
determining an amount of data to transfer through the wireless communication interface and at least one additional parameter characterizing operating conditions of the data transfer through the wireless communication interface;
transmitting the amount of data to transfer through the wireless communication interface and the at least one additional parameter characterizing the operating conditions of the data transfer through the wireless communication interface to an inference server executing a neural network inference engine, the transmission of the parameters being performed via one of the wireless communication interface or another communication interface of the computing device;
receiving an optimal data transfer rate of the wireless communication interface inferred by the neural network inference engine executed by the inference server, the inference of the optimal data transfer rate of the wireless communication interface being based on the amount of data to transfer through the wireless communication interface and the at least one additional parameter characterizing the operating conditions of the data transfer through the wireless communication interface, the reception of the optimal data transfer rate being performed via one of the wireless communication interface or the other communication interface of the computing device; and
configuring the wireless communication interface to operate at the optimal data transfer rate;
wherein the optimal data transfer rate is one of an optimal data transmission rate, an optimal data reception rate, or a symmetrical optimal data transfer rate.

2. The computing device of claim 1, wherein the computing device consists of an environment control device (ECD).

3. The computing device of claim 2, wherein the ECD consists of one of the following:
an environment controller, a sensor, a controlled appliance, and a relay.

4. The computing device of claim 1, wherein the data transfer is a transmission of data by the computing device through the wireless communication interface and the optimal data transfer rate is the optimal data transmission rate.

5. The computing device of claim 1, wherein the data transfer is a reception of data by the computing device through the wireless communication interface and the optimal data transfer rate is the optimal data reception rate.

6. The computing device of claim 1, wherein the data transfer is a transmission or a reception of data by the computing device through the wireless communication interface, and the optimal data transfer rate is the symmetrical optimal data transfer rate.

7. The computing device of claim 1, wherein the at least one additional parameter characterizing the operating conditions of the data transfer through the wireless communication interface comprises at least one of the following: a radio frequency, a signal strength, an error rate, and a period of time at which the data transfer occurs.

8. The computing device of claim 1, wherein the wireless communication interface is one of the following: a Wi-Fi communication interface, and a mesh communication interface.

9. A method for inferring an optimal wireless data transfer rate using an inference server, the method comprising:
determining by a processing unit of a computing device an amount of data to transfer through a wireless communication interface of the computing device and at least one additional parameter characterizing operating conditions of the data transfer through the wireless communication interface of the computing device, the processing unit comprising one or more processors;
transmitting by the processing unit the amount of data to transfer through the wireless communication interface and the at least one additional parameter characterizing the operating conditions of the data transfer through the wireless communication interface to an inference server executing a neural network inference engine, the transmission of the parameters being performed via one of the wireless communication interface or another communication interface of the computing device;
receiving by the processing unit an optimal data transfer rate of the wireless communication interface inferred by the neural network inference engine executed by the inference server, the inference of the optimal data transfer rate of the wireless communication interface being based on the amount of data to transfer through the wireless communication interface and the at least one additional parameter characterizing the operating conditions of the data transfer through the wireless communication interface, the reception of the optimal data transfer rate being performed via one of the wireless communication interface or the other communication interface of the computing device; and configuring by the processing unit the wireless communication interface to operate at the optimal data transfer rate;

wherein the optimal data transfer rate is one of an optimal data transmission rate, an optimal data reception rate, or a symmetrical optimal data transfer rate.

10. The method of claim 9, wherein the data transfer is a transmission of data by the computing device through the wireless communication interface and the optimal data transfer rate is the optimal data transmission rate.

11. The method of claim 9, wherein the data transfer is a reception of data by the computing device through the wireless communication interface and the optimal data transfer rate is the optimal data reception rate.

12. The method of claim 9, wherein the data transfer is a transmission or a reception of data by the computing device through the wireless communication interface, and the optimal data transfer rate is the symmetrical optimal data transfer rate.

13. The method of claim 9, wherein the at least one additional parameter characterizing the operating conditions of the data transfer through the wireless communication interface further comprises at least one of the following: a radio frequency, a signal strength, an error rate, and a period of time at which the data transfer occurs.

14. The method of claim 9, wherein the wireless communication interface is one of the following: a Wi-Fi communication interface, and a mesh communication interface.

15. The method of claim 9, wherein the computing device consists of one of the following: an environment controller, a sensor, a controlled appliance, and a relay.

16. An inference server, comprising:
a communication interface;
memory for storing a predictive model generated by a neural network training engine, the predictive model comprising weights of a neural network; and
a processing unit comprising one or more processors for:
receiving from a computing device via the communication interface an amount of data to transfer through a wireless communication interface of the computing device and at least one additional parameter characterizing operating conditions of the data transfer through the wireless communication interface of the computing device;

executing a neural network inference engine using the predictive model for inferring an optimal data transfer rate of the wireless communication interface of the computing device based on the amount of data to transfer through the wireless communication interface of the computing device and the at least one additional parameter characterizing the operating conditions of the data transfer through the wireless communication interface of the computing device; and transmitting to the computing device via the communication interface the optimal data transfer rate inferred by the neural network inference engine;

wherein the optimal data transfer rate is one of an optimal data transmission rate, an optimal data reception rate, or a symmetrical optimal data transfer rate.

17. The inference server of claim 16, wherein the data transfer is a transmission of data by the computing device through the wireless communication interface and the optimal data transfer rate is the optimal data transmission rate.

18. The inference server of claim 16, wherein the data transfer is a reception of data by the computing device through the wireless communication interface and the optimal data transfer rate is the optimal data reception rate.

19. The inference server of claim 16, wherein the data transfer is a transmission or a reception of data by the computing device through the wireless communication interface, and the optimal data transfer rate is the symmetrical optimal data transfer rate.

20. The inference server of claim 16, wherein the at least one additional parameter characterizing the operating conditions of the data transfer through the wireless communication interface of the computing device comprises at least one of the following: a radio frequency, a signal strength, an error rate, and a period of time at which the data transfer occurs.

21. The inference server of claim 16, wherein the wireless communication interface is one of the following: a Wi-Fi communication interface, and a mesh communication interface.

22. The inference server of claim 16, wherein the computing device consists of one of the following: an environment controller, a sensor, a controlled appliance, and a relay.

* * * * *